United States Patent
Kim et al.

(10) Patent No.: US 10,225,791 B2
(45) Date of Patent: Mar. 5, 2019

(54) DEVICE SEARCHING METHOD AND ELECTRONIC DEVICE FOR SUPPORTING THE SAME

(71) Applicant: Samsung Electronics Co., Ltd., Gyeonggi-do (KR)

(72) Inventors: Chang Soon Kim, Gyeonggi-do (KR); Jong Mu Choi, Gyeonggi-do (KR); Byung Moo Lee, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 78 days.

(21) Appl. No.: 15/042,496

(22) Filed: Feb. 12, 2016

(65) Prior Publication Data
US 2016/0242108 A1    Aug. 18, 2016

(30) Foreign Application Priority Data
Feb. 13, 2015  (KR) ........................ 10-2015-0022741

(51) Int. Cl.
| | |
|---|---|
| *H04W 72/04* | (2009.01) |
| *H04W 48/16* | (2009.01) |
| *H04L 29/06* | (2006.01) |
| *H04W 76/14* | (2018.01) |
| *H04W 76/12* | (2018.01) |
| *H04W 8/00* | (2009.01) |
| *H04L 29/12* | (2006.01) |

(52) U.S. Cl.
CPC ......... *H04W 48/16* (2013.01); *H04L 65/4076* (2013.01); *H04W 76/12* (2018.02); *H04W 76/14* (2018.02); *H04L 61/2007* (2013.01); *H04W 8/005* (2013.01)

(58) Field of Classification Search
None
See application file for complete search history.

(56) References Cited

U.S. PATENT DOCUMENTS

| | | |
|---|---|---|
| 8,904,021 B2 | 12/2014 | Harrison |
| 9,154,942 B2 | 10/2015 | Harrison et al. |
| 2011/0128946 A1 | 6/2011 | Saito et al. |

(Continued)

FOREIGN PATENT DOCUMENTS

| | | |
|---|---|---|
| JP | 2011-114765 A | 6/2011 |

OTHER PUBLICATIONS

Michael Montemurro, TDLS Peer Discovery, IEEE-SA Mentor, vol. 802, No. 7, Jan. 21, 2010, XP017678040, pp. 1-12, Piscataway, NJ, USA.

(Continued)

*Primary Examiner* — Anh Vu H Ly
*Assistant Examiner* — Hector Reyes
(74) *Attorney, Agent, or Firm* — Cha & Reiter, LLC

(57) ABSTRACT

A method comprising: transmitting, by a first electronic device, a discovery request message according to an internet protocol (IP) address of the first electronic device; receiving, by the first electronic device, a response to the discovery request message that is transmitted by a second electronic device according to an IP address of the second electronic device; and establishing a Tunneled Direct Link Setup (TDLS) channel with the second electronic device when the response to the discovery request message is received from the second electronic device.

14 Claims, 10 Drawing Sheets

(56) References Cited

U.S. PATENT DOCUMENTS

| | | | |
|---|---|---|---|
| 2012/0155350 A1* | 6/2012 | Wentink | H04W 8/005 |
| | | | 370/311 |
| 2013/0166759 A1* | 6/2013 | Rajamani | H04W 76/023 |
| | | | 709/227 |
| 2013/0176903 A1* | 7/2013 | Bijwe | H04W 76/022 |
| | | | 370/255 |
| 2014/0022146 A1* | 1/2014 | Thangadorai | H04N 21/4122 |
| | | | 345/2.3 |
| 2014/0195584 A1 | 7/2014 | Harrison | |
| 2014/0195690 A1 | 7/2014 | Harrison et al. | |
| 2015/0172905 A1* | 6/2015 | Qi | H04W 8/005 |
| | | | 370/338 |
| 2017/0099356 A1* | 4/2017 | Qi | H04L 67/16 |

OTHER PUBLICATIONS

Wi-Fi Display Technical Specification Version 1.1, Wi-Fi Alliance, Apr. 24, 2014, XP55238797, pp. 1-151.
European Search Report dated Jun. 23, 2016.

* cited by examiner

DEVICE SEARCHING METHOD AND ELECTRONIC DEVICE FOR SUPPORTING THE SAME

CLAIM OF PRIORITY

This application claims the benefit under 35 U.S.C. § 119(a) of a Korean patent application filed on Feb. 13, 2015 in the Korean Intellectual Property Office and assigned Serial number 10-2015-0022741, the entire disclosure of which is hereby incorporated by reference.

TECHNICAL FIELD

The present disclosure relates to electronic devices, in general, and more particularly, to a device searching method and electronic device for supporting the same.

BACKGROUND

Each of electronic devices, such as smartphones or tablet computers, may perform a variety of functions such as wireless communication functions and media output functions. The electronic device may use various communication manners for transmitting and receiving data with peripheral external devices while performing the functions. For example, the electronic device may transmit data about an output image to a peripheral display device (e.g., a TV and a monitor) using mirroring technologies. The display device may output the same image as an image output a screen of the electronic device in real time (or within a predetermined time difference).

The electronic device may transmit data to an external device using wireless-fidelity (Wi-Fi) communication. The Wi-Fi direct communication may be a communication method of directly and wirelessly connecting the electronic device to the external device and communicating data, not a communication method of communicating with another device through a separate communication network such as the Internet. Wi-Fi display (WFD) or Miracast of the Wi-Fi direct communication may be technologies in which the electronic device sends data to the external device to output the same screen on the external device. If the electronic device connects to the external device in a Miracast manner, screen information of the electronic device may be streamed on the external device through a real-time transport protocol (RTP). To output a screen on the external device in the Miracast manner, a search procedure of the external device should be previously performed.

FIG. 1 is a signal sequence diagram of a process that is known in the art.

Referring to FIG. 1, to establish a WFD connection, an electronic device 101 may connect with a network using tunneled direct link setup (TDLS). The TDLS may be network communication technologies for providing support to share data without the necessity of a separate medium for an inter-device network. The electronic device 101 may connect to an external device 102 through a communication connection of a layer 2 (L2) in an open system interconnection (OSI) 7 layer.

In operation 110, the electronic device 101 may broadcast a tunnel probe request based on an L2 frame to an AP 103. The request may include a WFD information element (IE), a basic service set identification (BSSID) (e.g., a medium access control (MAC) address) of the AP 103, an IP address of the electronic device 101, and the like.

In operation 120, the AP 103 may broadcast the request to the external device 102.

If receiving the request, in operation 130, the external device 102 may transmit a tunnel probe response to the AP 102. The tunnel probe response may be transmitted in a unicast manner.

In operation 140, the AP 103 may transmit the tunnel probe response to the electronic device 101.

The above-mentioned device searching method according to the related art is performed according to the L2 frame. Therefore, it is necessary to encapsulate or parse the request or response. If a peripheral is changed, it is necessary to correct a hardware chip (e.g., a Wi-Fi driver).

SUMMARY

According to aspects of the disclosure, a method is provided comprising: transmitting, by a first electronic device, a discovery request message according to an internet protocol (IP) address of the first electronic device; receiving, by the first electronic device, a response to the discovery request message that is transmitted by a second electronic device according to an IP address of the second electronic device; and establishing a Tunneled Direct Link Setup (TDLS) channel with the second electronic device when the response to the discovery request message is received from the second electronic device.

According to aspects of the disclosure, a system is provided comprising: a first electronic device; and a second electronic device, wherein first electronic device is configured to transmit a discovery request message according to an internet protocol (IP) address of the first electronic device, receive a response from the second electronic device according to an IP address of the second electronic device, and establish a Tunneled Direct Link Setup (TDLS) channel with the second electronic device; and wherein second electronic device is configured to receive the discovery request message, transmit the response, and establish the TDLS channel with the first electronic device, and wherein the TDLS channel is established based on the discovery request message and the response.

According to aspects of the disclosure, an electronic device is provided comprising: a memory; a communication module; and at least one processor operatively coupled to the memory, configured to: transmit a discovery request message according to an internet protocol (IP) address of the first electronic device; receiving a response to the discovery request message that is transmitted by an external electronic device according to an IP address of the external electronic device; and establish a Tunneled Direct Link Setup (TDLS) channel with the external electronic device when the response to the discovery request message is received.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
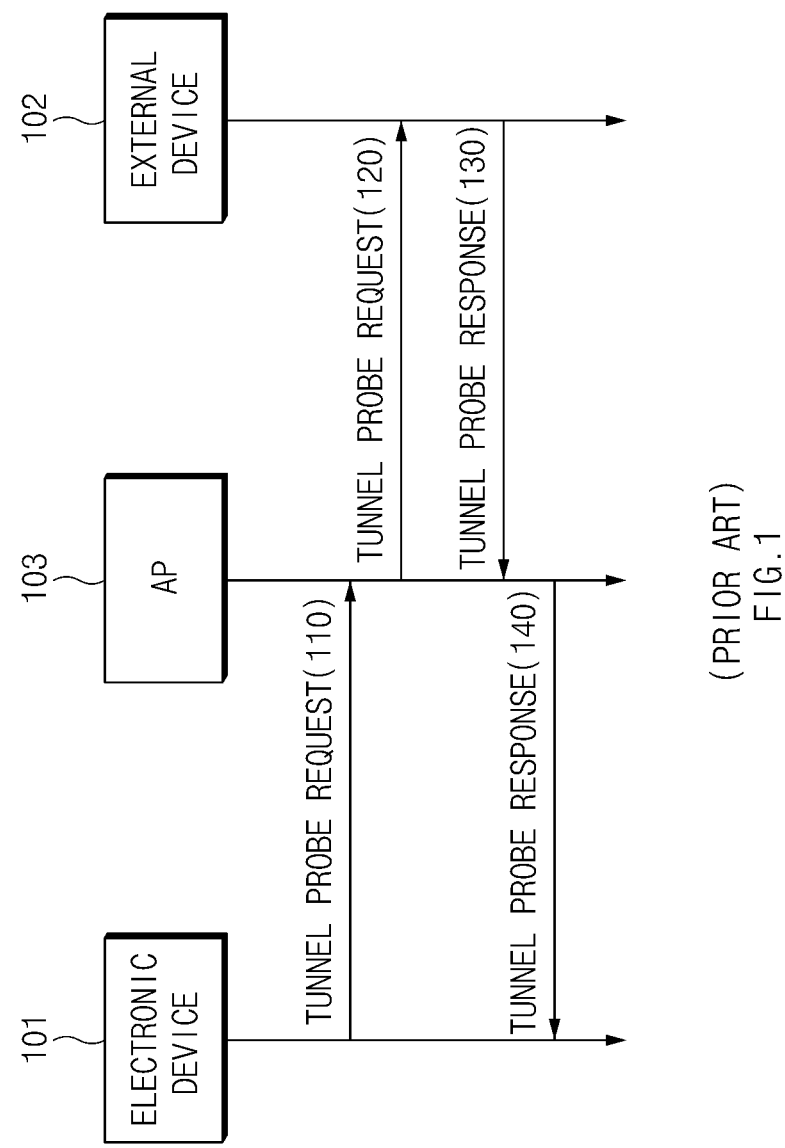
FIG. 1 is a sequence diagram of a process that is known in the art.

Hereinafter, the present disclosure is described with reference to the accompanying drawings. Various modifications are possible in various embodiments of the present disclosure and embodiments are illustrated in drawings and related detailed descriptions are listed. However, the present disclosure is not intended to be limited to the specific embodiments, and it is understood that it should include all modifications and/or, equivalents and substitutes within the scope and technical range of the present disclosure. With respect to the descriptions of the drawings, like reference numerals refer to like elements.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The expressions such as "1st", "2nd", "first", or "second", and the like used in various embodiments of the present disclosure may refer to various elements irrespective of the order and/or priority of the corresponding elements, but do not limit the corresponding elements. The expressions may be used to distinguish one element from another element. For instance, both "a first user device" and "a second user device" indicate different user devices from each other irrespective of the order and/or priority of the corresponding elements. For example, a first component may be referred to as a second component and vice versa without departing from the scope of the present disclosure.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

Depending on the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to perform A, B, and C" may mean a generic-purpose processor (e.g., a central processing unit (CPU) or an application processor) which may perform corresponding operations by executing one or more software programs which stores a dedicated processor (e.g., an embedded processor) for performing a corresponding operation.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

Electronic devices according to various embodiments of the present disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to an embodiment of the present disclosure, the wearable devices may include at least one of accessory-type wearable devices (e.g., watches, rings, bracelets, anklets, necklaces, glasses, contact lenses, or head-mounted-devices (HMDs)), fabric or clothing integral wearable devices (e.g., electronic clothes), body-mounted wearable devices (e.g., skin pads or tattoos), or implantable wearable devices (e.g., implantable circuits).

According to various embodiments of the present disclosure, the electronic devices may be smart home appliances. The smart home appliances may include at least one of, for example, televisions (TVs), digital versatile disk (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and PlayStation™), electronic dictionaries, electronic keys, camcorders, or electronic picture frames.

According to various embodiments of the present disclosure, the electronic devices may include at least one of various medical devices (e.g., various portable medical measurement devices (e.g., blood glucose meters, heart rate meters, blood pressure meters, or thermometers, and the like), a magnetic resonance angiography (MRA), a magnetic resonance imaging (MRI), a computed tomography (CT), scanners, or ultrasonic devices, and the like), navigation devices, global navigation satellite system (GNSS), event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to various embodiments of the present disclosure, the electronic devices may include at least one of parts of furniture or buildings/structures, electronic boards, electronic signature receiving devices, projectors, or various measuring instruments (e.g., water meters, electricity meters, gas meters, or wave meters, and the like). The electronic devices according to various embodiments of the present disclosure may be one or more combinations of the above-mentioned devices. The electronic devices according to various embodiments of the present disclosure may be flexible electronic devices. Also, electronic devices according to various embodiments of the present disclosure are not limited to the above-mentioned devices, and may include new electronic devices according to technology development Hereinafter, electronic devices according to various embodiments of the present disclosure will be described with reference to the accompanying drawings. The term "user" used herein may refer to a person who uses an electronic device or may refer to a device (e.g., an artificial electronic device) that uses an electronic device.

Figure 2:
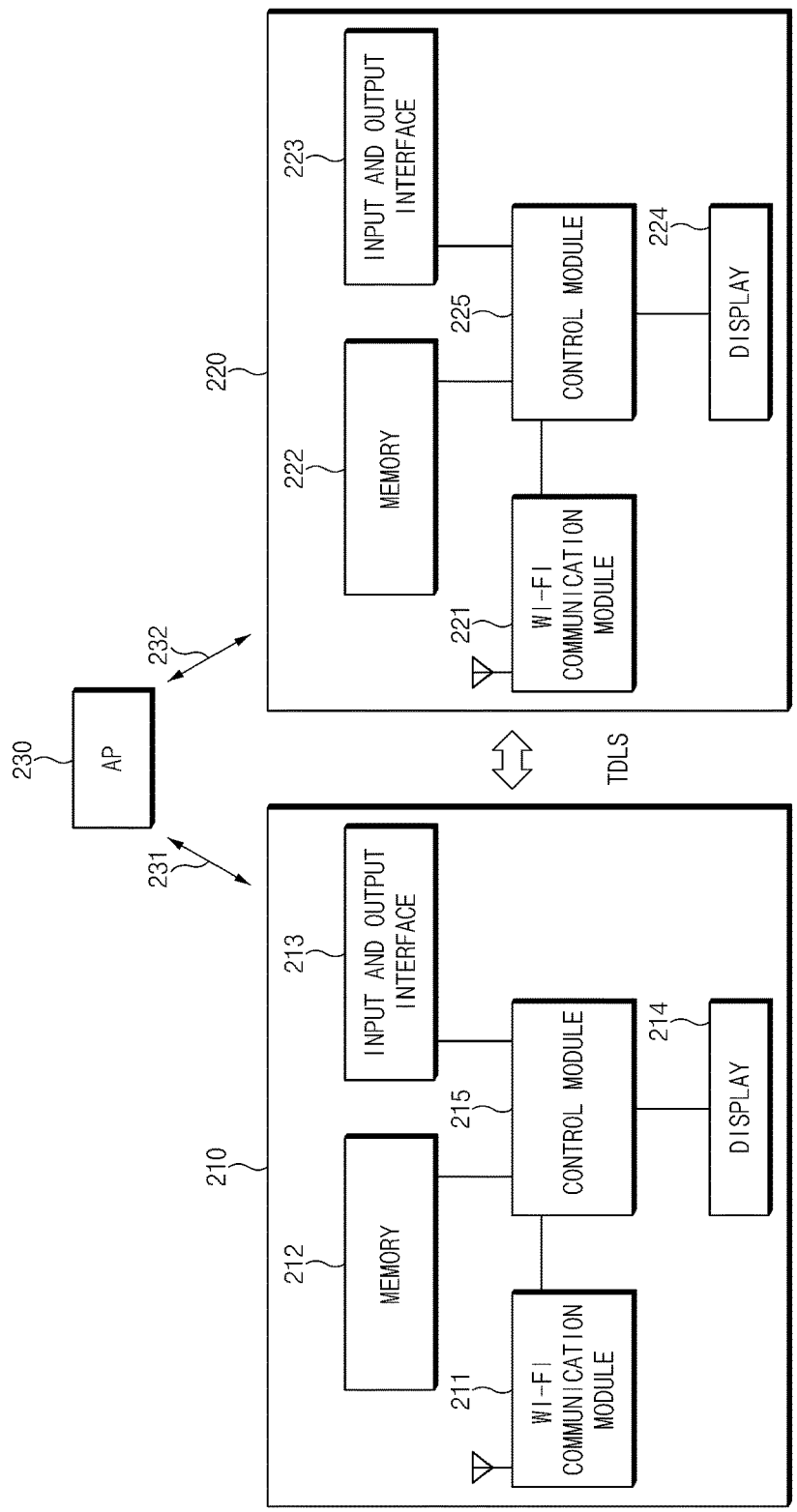
FIG. 2 is a block diagram of an example of a network, according to various embodiments of the present disclosure.

FIG. 2 is a block diagram of an example of a network, according to various embodiments of the present disclosure.

Referring to FIG. 2, the Wi-Fi network environment may include, for example, a first electronic device 210, a second electronic device 220, and an access point (AP) 230.

The first electronic device 210 may include a Wi-Fi communication module 211, a memory 212, an input and output interface 213, a display 214, and a control module 215. The control module 215 may include any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), etc. The memory 212 may include any suitable type of volatile or non-volatile memory, such as Random-access Memory (RAM), Read-Only Memory (ROM), Network Accessible Storage (NAS), cloud storage, a Solid State Drive (SSD), etc.

The first electronic device 210 may connect to the AP 230 through the Wi-Fi communication module 211 included in the first electronic device 210. The memory 212 of the first electronic device 210 may store at least one content which may be transmitted to an external device through Miracast (and/or another type of technology for outputting sound and/or image on an external device). Alternatively, the memory 212 may store at least one application for performing a predetermined function. The input and output interface 213 of the first electronic device 210 may receive an input signal associated with executing a Miracast function.

The display 214 may output a screen associated with executing the Miracast function. For example, the display 214 may output an icon or a menu item associated with executing the Miracast function (or another type of technology for outputting sound and/or image on an external device). If an input signal associated with selecting the icon or the menu item is received, the control module 215 of the first electronic device 210 may execute an internet protocol (IP)-based discovery routine. According to an embodiment of the present disclosure, the first electronic device 210 may discover a sink device (e.g., the second electronic device 220) to transmit content through Miracast, through a search (e.g., broadcasting) of a peripheral or using the AP 230. In the above-mentioned operation, the control module 215 of the first electronic device 210 may broadcast a discovery request message including the internet protocol (IP) address of the first electronic device 210. Alternatively, the control module 215 of the first electronic device 210 may use multicast to transmit the discovery request message to the first electronic device 210.

If a response message to the discovery request message is received, the control module 215 of the first electronic device 210 may parse the contents of the response message and may output the parsed contents on the display 214. For example, outputting the parsed contents may include outputting one or more content items that are part of the message, such as name (or another identifier) of the sink device (e.g., the second electronic device 220), on the display 214. When the first electronic device 210 detects an input selecting a specific sink device, the first electronic device 210 may begin exchanging data with the sink device (e.g., the second electronic device 220) in order to establish a Tunneled Direct Link Setup (TDLS) channel. In this operation, the first electronic device 210 may establish a first control channel 231 with the AP 230. Also, the first electronic device 210 may directly transmit data to the sink device (e.g., the second electronic device 220) by using TDLS. For example, the first electronic device 210 may transmit media data to the sink device (e.g., the second electronic device 220) by using the Real-Time Transport Protocol (RTP).

The second electronic device 220 may include a Wi-Fi communication module 221, a memory 220, an input and output interface 223, a display 224, and a control module 225. The control module 225 may include any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), etc. The memory 222 may include any suitable type of volatile or non-volatile memory, such as Random-access Memory (RAM), Read-Only Memory (ROM), Network Accessible Storage (NAS), cloud storage, a Solid State Drive (SSD), etc.

The second electronic device 220 may connect with the AP 230 according to the Wi-Fi communication module 221 included in the second electronic device 220. The memory 222 of the second electronic device 220 may store content received from an external electronic device through Miracast. Alternatively, the memory 222 may store at least one application associated with executing a predetermined function. The input and output interface 223 of the second electronic device 220 may receive an input signal associated with executing the Miracast function.

The display 224 may output a screen associated with executing the Miracast function. For example, the display 224 may output a request, associated with executing the Miracast function, which is received from a source device (e.g., the first electronic device 110). If receiving an input signal associated with approving the request, the control module 225 of the second electronic device 220 may transmit an IP-based response message. For example, the response message may include an IP address of the second electronic device 220, a device identifier, source device information (e.g., an IP address of the first electronic device 110), and the like. In various embodiments of the present disclosure, the control module 225 of the second electronic device 220 may use unicast to transmit the response message.

The control module 225 of the second electronic device 220 may establish a TDLS channel with the source device (e.g., the first electronic device 110) and may receive data from the source device (e.g., the first electronic device 110) over the TDLS channel. In this operation, the second electronic device 220 may establish a second control channel 232 with the AP 230. Also, the second electronic device 220 may use TDLS to directly receive data from the source device (e.g., the first electronic device 110). For example, the second electronic device 220 may receive media data from the source device (e.g., the first electronic device 110) by using RTP. The control module 225 of the second electronic device 220 may output any data that is received on the display 224. In various embodiments of the present disclosure, the control module 225 of the second electronic device 200 may be a processor of the second electronic device 220.

The AP 230 may assign an IP address to at least one electronic device which requests to access the AP 230. For example, the AP 230 may assign a predetermined IP address to the first electronic device 210 or the second electronic device 220. The AP 230 may verify IP address information of the second electronic device 220 to perform the Miracast function in response to a request of the first electronic device 210 and may transmit the verified IP address information to the second electronic device 220. The AP 230 may establish the first control channel 231 with the first electronic device 210 while the first electronic device 210 executes the Miracast function. Also, the AP 230 may establish the second control channel 232 with the second electronic device 220.

The first electronic device 210 and the second electronic device 220 may connect with each other through a TDLS channel. In various embodiments of the present disclosure, the first electronic device 210 and the second electronic device 220 may search for a device and may establish the TDLS channel, according to an IP address. The first electronic device 210 and the second electronic device 220 may search for a device according to an IP address without searching for the device according to a frame of a layer 2 (L2) in an open system interconnection (OSI) 7 layer. Additional information about a device searching method according to an IP address may be provided with reference to FIGS. 3 to 7. Hereinafter, an embodiment of the present disclosure is provided in which the first electronic device 210 is the source device and the second electronic device 220 is the sink device. The scope and spirit of the present disclosure may not be limited thereto. For example, if a plurality of electronic devices is placed in a predetermined space, one electronic device may operate as a source device and the other electronic devices may operate as sink devices.

According to various embodiments of the present disclosure, a network system for supporting a Miracast function may include a first electronic device configured to transmit a discovery request message, generated according to an IP address, on an IP layer, a second electronic device configured to receive the discovery request message and to transmit a response message according to an IP address, and an AP configured to connect to the first electronic device and the second electronic device. The first electronic device and the second electronic device may establish a TDLS channel according to the discovery request message and the response message.

According to various embodiments of the present disclosure, the first electronic device may transmit the discovery request message to the second electronic device through the AP. The second electronic device may transmit the response message to the first electronic device through the AP.

According to various embodiments of the present disclosure, an electronic device for supporting a Miracast function may include a control module configured to generate a discovery request message according to an IP address on an IP layer and a Wi-Fi communication module configured to transmit the generated discovery request message.

According to various embodiments of the present disclosure, the Wi-Fi communication module may receive a response message corresponding to the discovery request message from an external device. The control module may establish a TDLS channel with the external device according to the response message.

Figure 3:
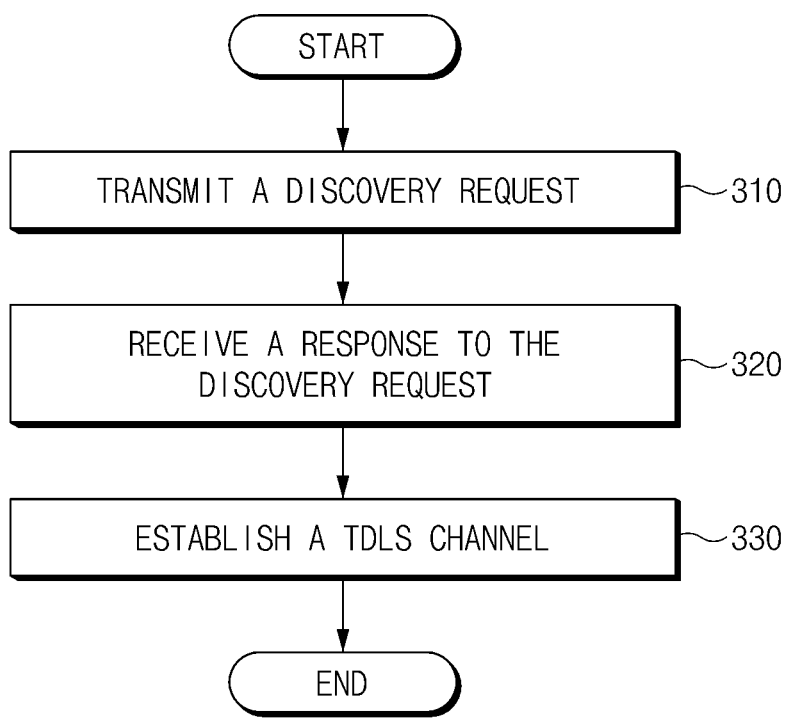
FIG. 3 is a flowchart of an example of a process for device discovery, according to various embodiments of the present disclosure.

FIG. 3 is a flowchart of an example of a process for device discovery, according to various embodiments of the present disclosure.

Referring to FIG. 3, if receiving a request associated with performing a discovery operation while performing a Miracast function, in operation 310, a first electronic device 210 of FIG. 2 may transmit a request for discovery, for example, a discovery request message according to an IP address. For example, the first electronic device 210 may transmit a discovery request message, including its IP address information, information about an AP 230 of FIG. 2 connected thereto, and its identifier information (or its device name and the like), to an external device (e.g., the AP 230 and a second electronic device 220 of FIG. 2). In various embodiments of the present disclosure, the discovery request message may be a broadcast message. In this case, the first electronic device 210 may broadcast a discovery request message, including its IP address information, to a peripheral.

In various embodiments of the present disclosure, the discovery request message may be a multicast message. In connection with sending the multicast message, the first electronic device 210 may write a multicast message using an IP address. For example, the first electronic device 210 may write a multicast message using an IP address assigned from the AP 230 connected thereto.

In operation 320, the second electronic device 220 may receive a discovery request message that is transmitted (and/or broadcast) by the first electronic device 210 and may transmit a response, for example, a corresponding response message according to an IP address.

In various embodiments of the present disclosure, if receiving the discovery request message, the second electronic device 220 may verify contents of the discovery request message and may write a response message corresponding to the discovery request message. For example, the second electronic device 220 may write a response message including its IP address information, information about the AP 230 connected thereto, and its identifier information (or its device name information and the like). The second electronic device 220 may transmit the response message to the first electronic device 210. In this operation, the second electronic device 220 may transmit a response message to the first electronic device 210 by using unicast transmission. The response message may be transmitted by using IP address information included in the received discovery request message.

In operation 330, the first electronic device 210 and the second electronic device 220 may establish a TDLS channel according to an IP address included in the request or response. The first electronic device 210 may use TDLS to directly transmit data to the second electronic device 220, which is a sink device. For example, the first electronic device 210 may use RTP to transmit media data to the second electronic device 220.

Figure 4:
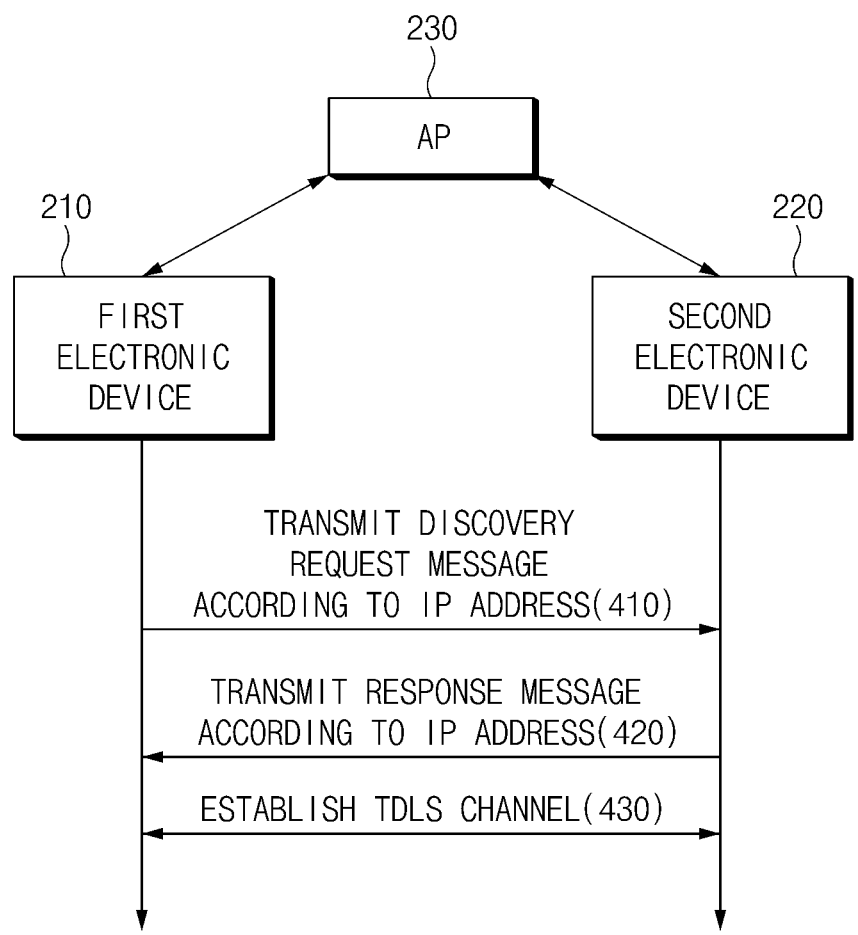
FIG. 4 is a sequence diagram of an example of a process for device discovery, according to various embodiments of the present disclosure.

FIG. 4 is a sequence diagram of an example of a process for device discovery, according to various embodiments of the present disclosure. In FIG. 4, an embodiment of the present disclosure is exemplified as a first electronic device 210 and a second electronic device 220 connect to the same AP 230. The scope and spirit of the present disclosure may not be limited thereto. For example, the first electronic device 210 may connect to a first AP, and the second electronic device 220 may connect to a second AP.

Referring to FIG. 4, in operation 410, the first electronic device 210 may transmit a request for discovery, for example, a discovery request message according to an IP address. The discovery request message may be transmitted by using broadcast or multicast transmission. Also, the discovery request message may include the IP address of the first electronic device 210, information associated with the AP 230, which is connected to the first electronic device 210, and an identifier (or device name and the like) of the first electronic device 210.

In operation 420, the second electronic device 220 may transmit a response, for example, a response message corresponding to the discovery request message. In some implementations, the response message may be transmitted by using the Internet Protocol. The second electronic device 220 may transmit a response message to the first electronic device 210 by using unicast transmission. The response message may be transmitted by using the IP address information of the first electronic device 210, which is included in the received discovery request message.

According to various embodiments of the present disclosure, the first electronic device 210 may receive the response message from the second electronic device 220 and may output device selection information on a display 214 of FIG. 2. The output device selection information may be generated based at least in part on the contents of the received response message. A user may verify the device selection information displayed on the display 214 and may select at least one device to connect through Miracast (or type of another technology for outputting sound or image on an external device).

In operation 430, the first electronic device 210 and the second electronic device 220 may establish a TDLS channel according to an IP address included in the request or response. The first electronic device 210 may then use the TDLS channel to directly transmit data to the second electronic device 220. For example, the first electronic device 210 may transmit media data to the second electronic device 220 by using RTP.

According to various embodiments of the present disclosure, the first electronic device 210 may verify a connection history log and detect that the first electronic device has been connected to the second electronic device 220 in the past. For example, if the second electronic device 220 is a device having previous Miracast connection history, the first electronic device 210 may use TDLS to transmit data to the second electronic device 220. According to various embodiments of the present disclosure, the first electronic device 210 may wait for a predetermined time period while a plurality of device selection information corresponding to a plurality of response messages are output and may automatically select the second electronic device if there is no separate input signal. The second device 220 may be selected based on there being a history of past connections between the first device 210 and the second device 220.

Figure 5:
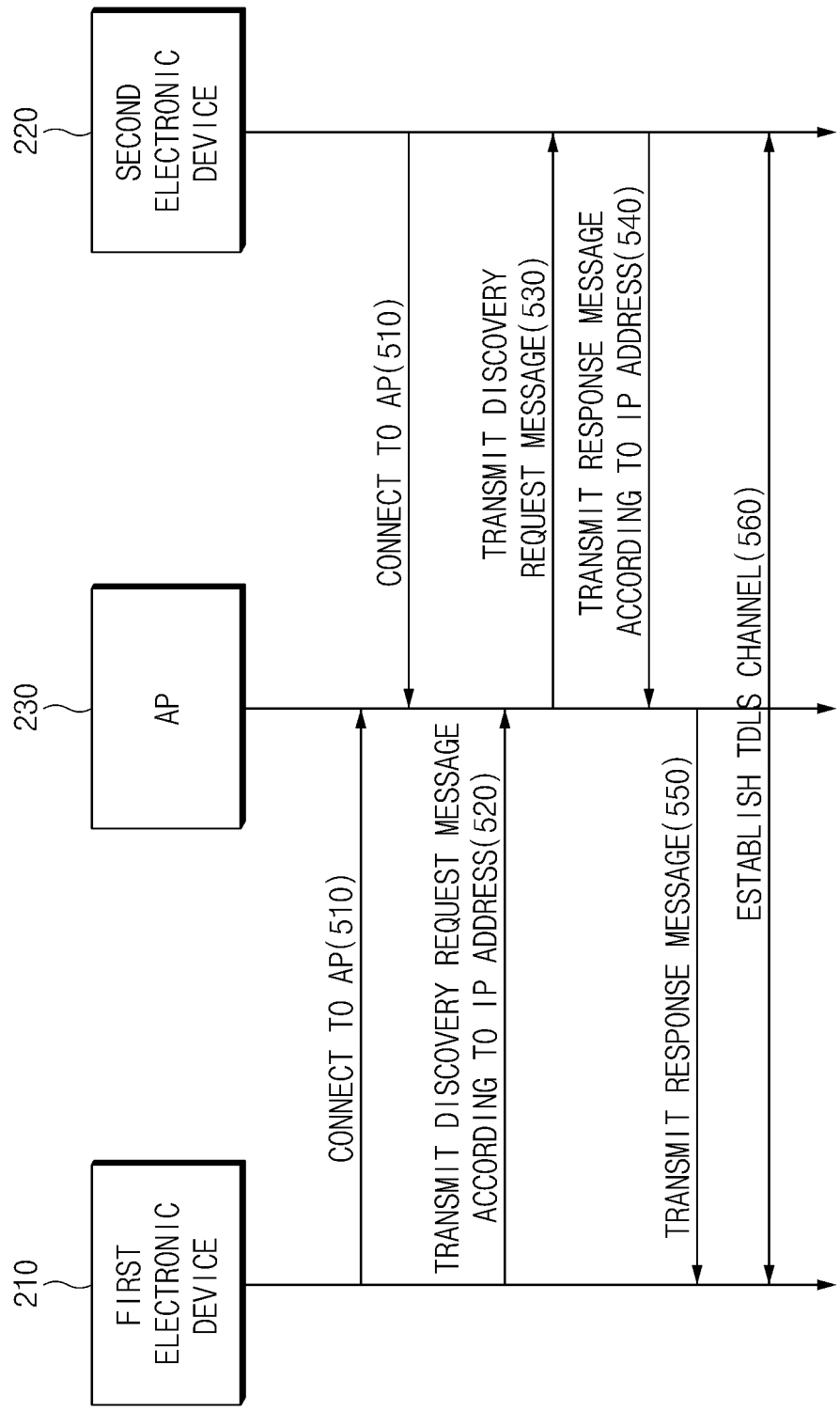
FIG. 5 is a sequence diagram of an example of a process for device discovery, according to various embodiments of the present disclosure.

FIG. 5 is a sequence diagram of an example of a process for device discovery, according to various embodiments of the present disclosure.

Referring to FIG. 5, in operation 510, a first electronic device 210 and a second electronic device 220 may connect to the same access point (AP) 230. The AP 230 may assign an IP address to each of the first electronic device 210 and the second electronic device 220. In FIG. 5, an embodiment of the present disclosure is provided in which the first electronic device 210 first connects to the AP 230 and the second electronic device 220 then connects to the AP 230. The scope and spirit of the present disclosure may not be limited thereto.

In operation 520, the first electronic device 210 may transmit a request for discovery, for example, a discovery request message to the AP 230 according to its IP address. For example, the first electronic device 210 may transmit a discovery request message including its IP address information and its identifier information (or its device name information and the like).

In various embodiments of the present disclosure, the discovery request message may include only part of an IP address of the first electronic device 210. For example, the request may be set to include only the last one or more digits for a predetermined range of an IP address. In various embodiments of the present disclosure, the discovery request message may include a Wi-Fi display (WFD) information element (IE), a basic service set identification (BSSID) (e.g., a medium access control (MAC) address) of an AP connected to the first electronic device 210, an IP address of the first electronic device 210, and the like.

In operation 530, the AP 230 may forward the received discovery request message to a peripheral electronic device (e.g., the second electronic device 220). In some implementations, the AP 230 may transmit the discovery request message by using broadcast or unicast transmission. The peripheral electronic device (e.g., the second electronic device 220) may receive the discovery request message, may process the request through an IP-based protocol, and may operate on layer 2 of the OSI model independently.

In operation 540, if receiving the discovery request message, the second electronic device 220 may transmit a response, for example, a response message to the AP 230. The final recipient of the response may be the second electronic device 220. In various embodiments of the present disclosure, the second electronic device 220 may transmit a response message to the AP 230 by using unicast transmission. The message may be transmitted by using the IP address of the first electronic device 210, which may be obtained from the discovery request message.

In operation 550, if receiving the response message of the second electronic device 220, the AP 230 may transmit the response message to the first electronic device 210. The AP 230 may verify the IP address information of the first electronic device 210 in response to a request from the second electronic device 220 and may transmit the verified IP address information to the first electronic device 210. The first electronic device 210 may process the response message through an IP-based protocol and may operate independently on layer 2 of the OSI model.

In operation 560, the first electronic device 210 and the second electronic device 220 may establish a TDLS channel by using an IP address included in the request or response. The first electronic device 210 may directly transmit data to the second electronic device 220, which is a sink device over the TDLS channel. For example, the first electronic device 210 may transmit media data to the second electronic device 220 by using RTP.

Figure 6:
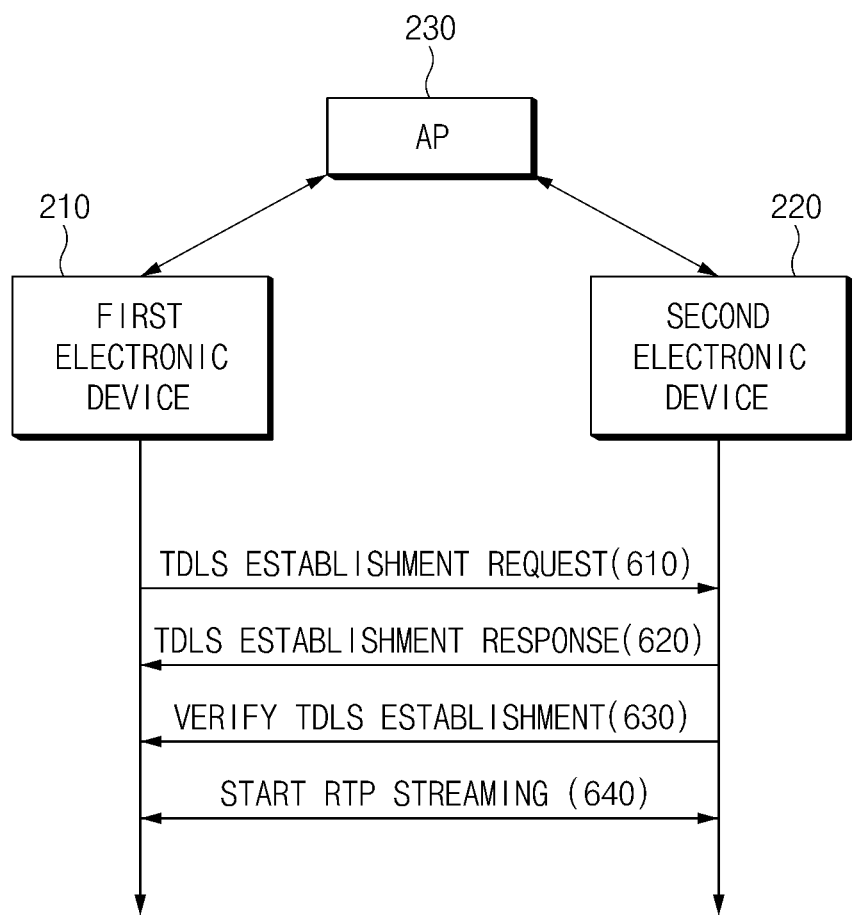
FIG. 6 is a sequence diagram of an example of a process for establishing and using a Tunneled Direct Link Setup (TDLS), according to various embodiments of the present disclosure.

FIG. 6 is a sequence diagram of an example of a process for establishing and using a Tunneled Direct Link Setup (TDLS), according to various embodiments of the present disclosure.

Referring to FIG. 6, in operation 610, a first electronic device 210 may transmit a TDLS establishment request to a second electronic device 220. In various embodiments of the present disclosure, the TDLS establishment request may include information (e.g., a BSSID) about the AP 230, an IP address of the second electronic device 220, and the like.

In operation 620, the second electronic device 220 may transmit a TDLS establishment response corresponding to the TDLS establishment request to the first electronic device 210. The TDLS establishment response may be a signal confirming that the TDLS establishment request is received.

In operation 630, the second electronic device 220 may verify information of the TDLS establishment request. If it is possible to establish a TDLS channel according to the information included in the TDLS establishment request, the second electronic device 220 may transmit a TDLS establishment verification signal to the first electronic device 210.

In operation 640, the first electronic device 210 may directly transmit data to the second electronic device 220, which is a sink device, in a TDLS manner. For example, the first electronic device 210 may transmit media data by an RTP manner to the second electronic device 220.

Figure 7:
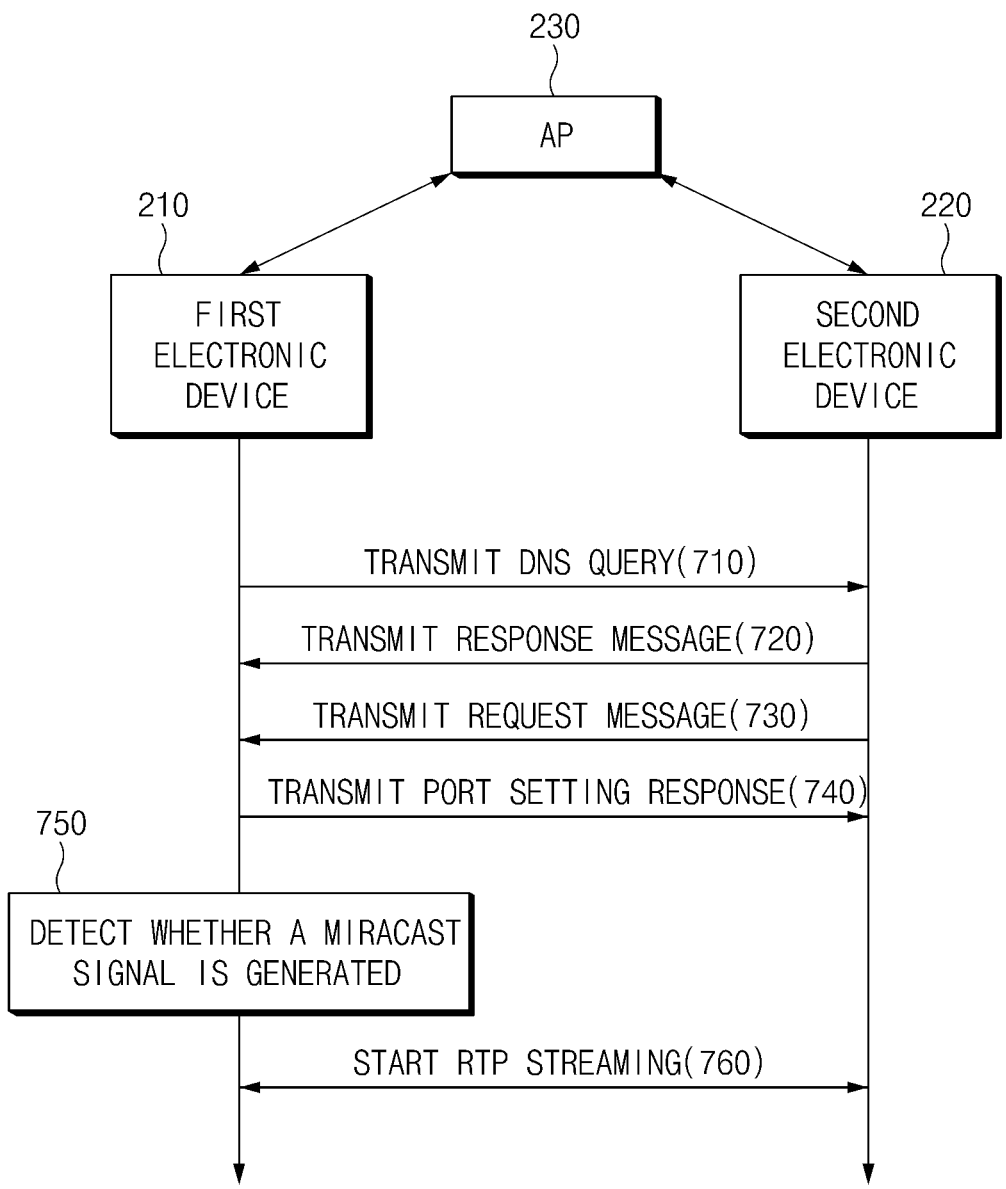
FIG. 7 is sequence diagram of an example of a process for outputting data by an external device, according to various embodiments of the present disclosure.

FIG. 7 is sequence diagram of an example of a process for outputting data on an external device, according to various embodiments of the present disclosure;

Referring to FIG. 7, in operation 710, a first electronic device 210 may transmit a domain name system (DNS) query to a second electronic device 220. In various embodiments of the present disclosure, the DNS query may be a broadcasting message to a source device according to Miracast (or another type of technology for outputting sound and/or image on an external device).

In operation 720, the second electronic device 220 may transmit a response message corresponding to the DNS query to the first electronic device 210.

If receiving the response message, in operation 730, the second electronic device 220 may transmit a request message for information (e.g., an IP address) associated with a TDLS connection to the first electronic device 210. In various embodiments of the present disclosure, the request message may include an IP address of the second electronic device 220.

In operation 740, the first electronic device 210 may transmit a port setting response to the second electronic device 220.

In operation 750, the first electronic device 210 may detect whether a Miracast execution signal is generated by an application.

In operation 760, the first electronic device 210 may begin streaming data over a TDLS channel.

According to various embodiments of the present disclosure, a device searching method associated with a Miracast function may include sending, by the first electronic device, a discovery request message generated according to an IP address of a first electronic device on an IP address, receiving, by the second electronic device, the discovery request message, sending, by the second electronic device, a response message according to an IP address of the second electronic device, and establishing, by the first electronic device and the second electronic device, a tunneled direct link setup (TDLS) channel.

According to various embodiments of the present disclosure, the sending of the discovery request message may include sending the discovery request message to an AP in a state where the first electronic device and the second electronic device connect to the one AP. The sending of the discovery request message may further include sending, by the AP, the discovery request message to the second electronic device.

According to various embodiments of the present disclosure, the sending of the response message may include sending the response message to an AP in a state where the first electronic device and the second electronic device connect to the one AP. The sending of the discovery request message may further include sending, by the AP, the response message to the first electronic device.

According to various embodiments of the present disclosure, the establishing of the TDLS channel may include using the Real-Time Streaming Protocol (RTSP) or RTP to communicate. The discovery request message may be a broadcast message or a multicast message. The response message may be a unicast message.

According to various embodiments of the present disclosure, the discovery request message or the response message may include at least one of IP address information, access point (AP) connection information, or device identifier information. The discovery request message or the response message may be an IP address based message according to one of a bonjour manner and a universal plug and play (UPnP) manner.

Figure 8:
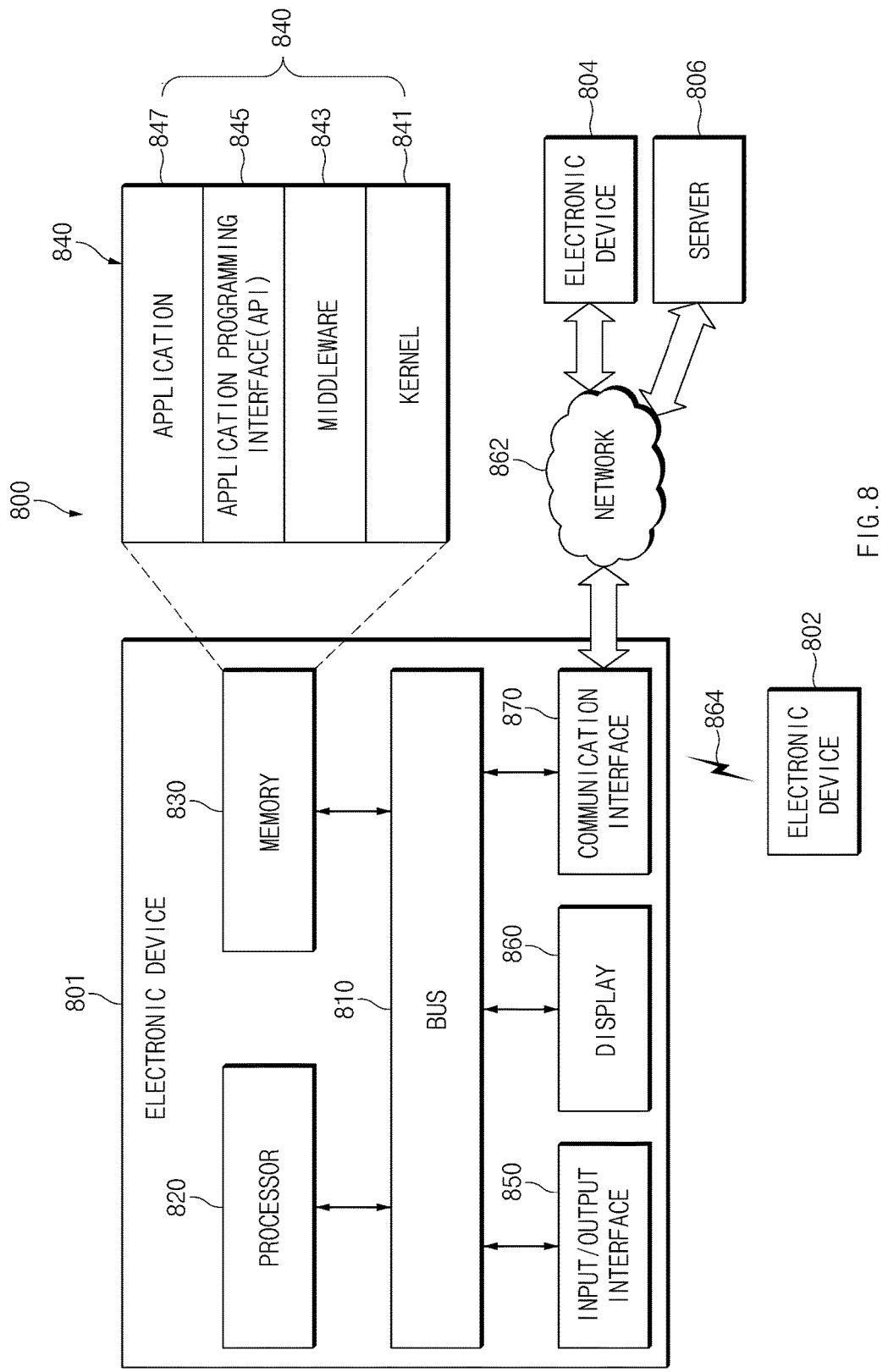
FIG. 8 is a block diagram of an example of an electronic device, according to various embodiments of the present disclosure.

FIG. 8 is a block diagram of an example of an electronic device, according to various embodiments of the present disclosure.

A description will be given of the electronic device 801 in a network environment 800 with reference to FIG. 8 according to various embodiments of the present disclosure. The electronic device 801 may include a bus 810, a processor 820, a memory 830, an input and output interface 850, a display 860, and a communication interface 870. In various embodiments of the present disclosure, at least one of the components may be omitted from the electronic device 801, and other components may be additionally included in the electronic device 801.

The bus 810 may be, for example, a circuit which connects the components 820 to 870 with each other and transmits communications (e.g., a control message and/or data) between the components.

The processor 820 may include one or more of a central processing unit (CPU), an application processor (AP), or a communication processor (CP). For example, the processor 820 may perform calculation or data processing about control and/or communication of at least another of the components of the electronic device 801.

The memory 830 may include a volatile and/or non-volatile memory. The memory 830 may store, for example, instructions or data associated with at least another of the components of the electronic device 801. According to an embodiment of the present disclosure, the memory 830 may software and/or a program 840. The program 840 may include, for example, a kernel 841, a middleware 843, an application programming interface (API) 845, and/or an application program (or an "application") 847. At least part of the kernel 841, the middleware 843, or the API 845 may be referred to as an operating system (OS).

The kernel 841 may control or manage, for example, system resources (e.g., the bus 810, the processor 820, or the memory 830, and the like) used to execute an operation or function implemented in the other programs (e.g., the middleware 843, the API 845, or the application program 847). Also, as the middleware 843, the API 845, or the application program 847 accesses a separate component of the electronic device 801, the kernel 841 may provide an interface which may control or manage system resources.

The middleware 843 may play a role as, for example, a go-between such that the API 845 or the application program 847 communicates with the kernel 841 to communicate data.

Also, the middleware 843 may process one or more work requests received from the application program 847 according to priority. For example, the middleware 843 may provide priority which may use system resources (the bus 810, the processor 820, or the memory 830, and the like) of the electronic device 801 to at least one of the application program 847. For example, the middleware 843 may perform scheduling or load balancing for the one or more work requests by processing the one or more work requests according to the priority provided to the at least one of the application program 847.

The API 845 may be, for example, an interface in which the application program 847 controls a function provided by the kernel 841 or the middleware 843. For example, the API 845 may include at least one interface or function (e.g., instruction) for file control, window control, image processing, or text control, and the like.

The input and output interface 850 may play a role as, for example, an interface which may transmit instructions or data input from a user or another external device to another component (or other components) of the electronic device 801. Also, input and output interface 850 may output instructions or data received from another component (or other components) of the electronic device 801 to the user or the other external device.

The display 860 may include, for example, a liquid crystal display (LCD), a light-emitting diode (LED) display, an organic LED (OLED) display, a microelectromechanical systems (MEMS) display, or an electronic paper display. The display 860 may display, for example, a variety of content (e.g., text, images, videos, icons, or symbols, and the like) to the user. The display 860 may include a touch screen, and may receive, for example, touch, gesture, proximity, or a hovering input using an electronic pen or part of a body of the user.

The communication interface 870 may establish communication between, for example, the electronic device 801 and an external device (e.g., a first external electronic device 802, a second external electronic device 804, or a server 806). For example, the communication interface 870 may connect to a network 862 through wireless communication or wired communication and may communicate with the external device (e.g., the second external electronic device 804 or the server 806).

The wireless communication may use, for example, at least one of long-term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), and the like as a cellular communication protocol. Also, the wireless communication may include, for example, local-area communication 864. The local-area communication 864 may include, for example, at least one of wireless-fidelity (Wi-Fi) communication, Bluetooth (BT) communication, near field communication (NFC), or global navigation satellite system (GNSS) communication, and the like. The GNSS may include, for example, at least one of a global positioning system (GPS), a Glonass, a Beidou navigation satellite system (hereinafter referred to as a "Beidou"), or a Galileo (i.e., the European global satellite-based navigation system) according to an available area or a bandwidth, and the like. Hereinafter, the term "GPS" used herein may be used interchangeably with the term "GNSS". The wired communication may include at least one of, for example, universal serial bus (USB) communication, high definition multimedia interface (HDMI) communication, recommended standard 232 (RS-232) communication, or plain old telephone service (POTS) communication, and the like. The network 862 may include a telecommunications network, for example, at least one of a computer network (e.g., a local area network (LAN) or a wide area network (WAN)), the Internet, or a telephone network.

Each of the first and second external electronic devices 802 and 804 may be the same or different device from the electronic device 801. According to an embodiment of the present disclosure, the server 806 may include a group of one or more servers. According to various embodiments of the present disclosure, all or some of operations executed in the electronic device 801 may be executed in another electronic device or a plurality of electronic devices (e.g., the first and second external electronic devices 802 and 804 or the server 806). According to an embodiment of the present disclosure, if the electronic device 801 should perform any function or service automatically or according to a request, it may request another device (e.g., the first and second external electronic devices 802 and 804 or the server 806) to perform at least part of the function or service, rather than executing the function or service for itself or in addition to the function or service. The other electronic device (e.g., the first and second external electronic devices 802 and 804 or the server 806) may execute the requested function or the added function and may transmit the executed result to the electronic device 801. The electronic device 801 may process the received result without change or additionally and may provide the requested function or service. For this purpose, for example, cloud computing technologies, distributed computing technologies, or client-server computing technologies may be used.

Figure 9:
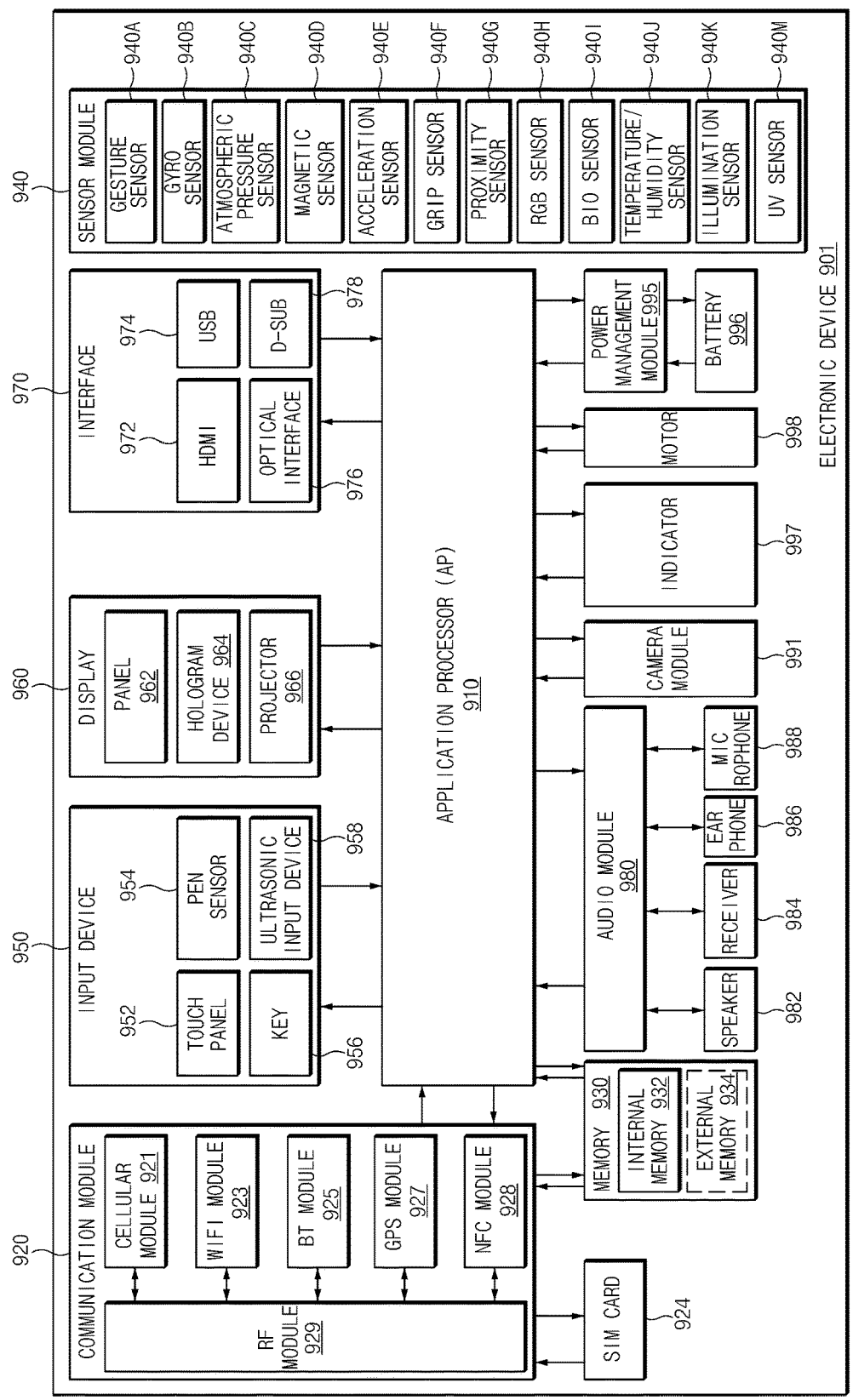
FIG. 9 is a block diagram of an example of an electronic device, according to various embodiments of the present disclosure.

FIG. 9 is a block diagram of an example of an electronic device, according to various embodiments of the present disclosure. The electronic device 901 may include, for example, all or part of an electronic device 801 shown in FIG. 8. The electronic device 901 may include one or more processors 910 (e.g., application processors (APs)), a communication module 920, a subscriber identification module (SIM) 924, a memory 930, a sensor module 940, an input device 950, a display 960, an interface 970, an audio module 980, a camera module 991, a power management module 995, a battery 996, an indicator 997, and a motor 998.

The processor 910 may drive, for example, an operating system (OS) or an application program to control a plurality of hardware or software components connected thereto and may process and compute a variety of data. The processor 910 may be implemented with, for example, a system on chip (SoC). According to an embodiment of the present disclosure, the processor 910 may further include a graphic processing unit (GPU) (not shown) and/or an image signal processor (not shown). The processor 910 may include at least some (e.g., a cellular module 921) of the components shown in FIG. 9. The processor 910 may load instructions or data received from at least one of other components (e.g., a non-volatile memory) to a volatile memory to process the data and may store various data in a non-volatile memory.

The communication module 920 may have the same or similar configuration to that of a communication interface 870 of FIG. 8. The communication module 920 may include, for example, the cellular module 921, a wireless-fidelity (Wi-Fi) module 923, a Bluetooth (BT) module 925, a global navigation satellite system (GNSS) module 927 (e.g., a GPS module, a Glonass module, a Beidou module, or a Galileo module), a near field communication (NFC) module 928, and a radio frequency (RF) module 929.

The cellular module 921 may provide, for example, a voice call service, a video call service, a text message service, or an Internet service, and the like through a communication network. According to an embodiment of the present disclosure, the cellular module 921 may identify and authenticate the electronic device 901 in a communication network using a SIM (e.g., the SIM 924). According to an embodiment of the present disclosure, the cellular module 921 may perform at least part of functions which may be provided by the processor 910. According to an embodiment of the present disclosure, the cellular module 921 may include a communication processor (CP).

The Wi-Fi module 923, the BT module 925, the GNSS module 927, or the NFC module 928 may include, for example, a processor for processing data transmitted and received via the corresponding module. According to various embodiments of the present disclosure, at least some (e.g., two or more) of the cellular module 921, the Wi-Fi module 923, the BT module 925, the GNSS module 927, or the NFC module 928 may be included in one integrated chip (IC) or one IC package.

The RF module 929 may transmit and receive, for example, a communication signal (e.g., an RF signal). Though not shown, the RF module 929 may include, for example, a transceiver, a power amplifier module (PAM), a frequency filter, or a low noise amplifier (LNA), or an antenna, and the like. According to another embodiment of the present disclosure, at least one of the cellular module 921, the Wi-Fi module 923, the BT module 925, the GNSS module 927, or the NFC module 928 may transmit and receive an RF signal through a separate RF module.

The SIM 924 may include, for example, a card which includes a SIM and/or an embedded SIM. The SIM 924 may include unique identification information (e.g., an integrated circuit card identifier (ICCID)) or subscriber information (e.g., an international mobile subscriber identity (IMSI)).

The memory 930 (e.g., a memory 830 of FIG. 8) may include, for example, an embedded memory 932 or an external memory 934. The embedded memory 932 may include at least one of, for example, a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid-state drive (SSD)).

The external memory 934 may further include a flash drive, for example, a compact flash (CF), a secure digital (SD), a micro-SD, a mini-SD, an extreme digital (xD), or a memory stick, and the like. The external memory 934 may functionally and/or physically connect to the electronic device 901 through various interfaces.

The sensor module 940 may measure, for example, a physical quantity or may detect an operation state of the electronic device 901, and may convert the measured or detected information to an electric signal. The sensor module 940 may include at least one of, for example, a gesture sensor 940A, a gyro sensor 940B, a barometric pressure sensor 940C, a magnetic sensor 940D, an acceleration sensor 940E, a grip sensor 940F, a proximity sensor 940G, a color sensor 940H (e.g., red, green, blue (RGB) sensor), a biometric sensor 940I, a temperature/humidity sensor 940J, an illumination sensor 940K, or an ultraviolet (UV) sensor 940M. Additionally or alternatively, the sensor module 940 may further include, for example, an e-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), and/or a fingerprint sensor (not shown), and the like. The sensor module 940 may further include a control circuit for controlling at least one or more sensors included therein. According to various embodiments of the present disclosure, the electronic device 901 may further include a processor configured to control the sensor module 940, as part of the processor 910 or to be independent of the processor 910. While the processor 910 is in a sleep state, the electronic device 901 may control the sensor module 940.

The input device 950 may include, for example, a touch panel 952, a (digital) pen sensor 954, a key 956, or an ultrasonic input unit 958. The touch panel 952 may recognize a touch input using at least one of, for example, a capacitive detecting method, a resistive detecting method, an infrared detecting method, or an ultrasonic detecting method. Also, the touch panel 952 may further include a control circuit. The touch panel 952 may further include a tactile layer and may provide a tactile reaction to a user.

The (digital) pen sensor 954 may be, for example, part of a touch panel or may include a separate sheet for recognition. The key 956 may include, for example, a physical button, an optical key, or a keypad. The ultrasonic input unit 958 may allow the electronic device 901 to detect a sound wave using a microphone (e.g., a microphone 988) and to verify data through an input tool generating an ultrasonic signal.

The display module 960 (e.g., a display 860 of FIG. 8) may include a panel 962, a hologram device 964, or a projector 966. The panel 962 may include the same or similar configuration as or to that of the display 860. The panel 962 may be implemented to be, for example, flexible, transparent, or wearable. The panel 962 and the touch panel 952 may be integrated into one module. The hologram device 964 may show a stereoscopic image in a space using interference of light. The projector 966 may project light onto a screen to display an image. The screen may be positioned, for example, inside or outside the electronic device 901. According to an embodiment of the present disclosure, the display 960 may further include a control circuit for controlling the panel 962, the hologram device 964, or the projector 966.

The interface 970 may include, for example, a high-definition multimedia interface (HDMI) 972, a universal serial bus (USB) 974, an optical interface 976, or a D-subminiature 978. The interface 970 may be included in, for example, a communication interface 870 shown in FIG. 8. Additionally or alternatively, the interface 970 may include, for example, a mobile high-definition link (MHL) interface, an SD card/multimedia card (MMC) interface, or an infrared data association (IrDA) standard interface.

The audio module 980 may convert a sound and an electric signal in dual directions. At least part of components of the audio module 980 may be included in, for example, an input and output interface 850 shown in FIG. 8. The audio module 980 may process sound information input or output through, for example, a speaker 982, a receiver 984, an earphone 986, or the microphone 988, and the like.

The camera module 991 may be a device which captures a still image and a moving image. According to an embodiment of the present disclosure, the camera module 991 may include one or more image sensors (not shown) (e.g., a front sensor or a rear sensor), a lens (not shown), an image signal processor (ISP) (not shown), or a flash (not shown) (e.g., an LED or a xenon lamp).

The power management module 995 may manage, for example, the power supply of the electronic device 901. According to an embodiment of the present disclosure, though not shown, the power management module 995 may include a power management integrated circuit (PMIC), a charger IC or a battery or fuel gauge. The PMIC may have a wired charging method and/or a wireless charging method. The wireless charging method may include, for example, a magnetic resonance method, a magnetic induction method, or an electromagnetic method, and the like. An additional circuit for wireless charging, for example, a coil loop, a resonance circuit, or a rectifier, and the like may be further provided. The battery gauge may measure, for example, the remaining capacity of the battery 996 and voltage, current, or temperature thereof while the battery 996 is charged. The battery 996 may include, for example, a rechargeable battery or a solar battery.

The indicator 997 may display a specific state of the electronic device 901 or part (e.g., the processor 910) thereof, for example, a booting state, a message state, or a charging state, and the like. The motor 998 may convert an electric signal into mechanical vibration and may generate a vibration or a haptic effect, and the like. Though not shown, the electronic device 901 may include a processing unit (e.g., a GPU) for supporting a mobile TV. The processing unit for supporting the mobile TV may process media data according to standards, for example, a digital multimedia broadcasting (DMB) standard, a digital video broadcasting (DVB) standard, or a mediaFlo™ standard, and the like.

Each of the above-mentioned elements of the electronic device according to various embodiments of the present disclosure may be configured with one or more components, and names of the corresponding elements may be changed according to the type of the electronic device. The electronic device according to various embodiments of the present disclosure may include at least one of the above-mentioned elements, some elements may be omitted from the electronic device, or other additional elements may be further included in the electronic device. Also, some of the elements of the electronic device according to various embodiments of the present disclosure may be combined with each other to form one entity, thereby making it possible to perform the functions of the corresponding elements in the same manner as before the combination.

Figure 10:
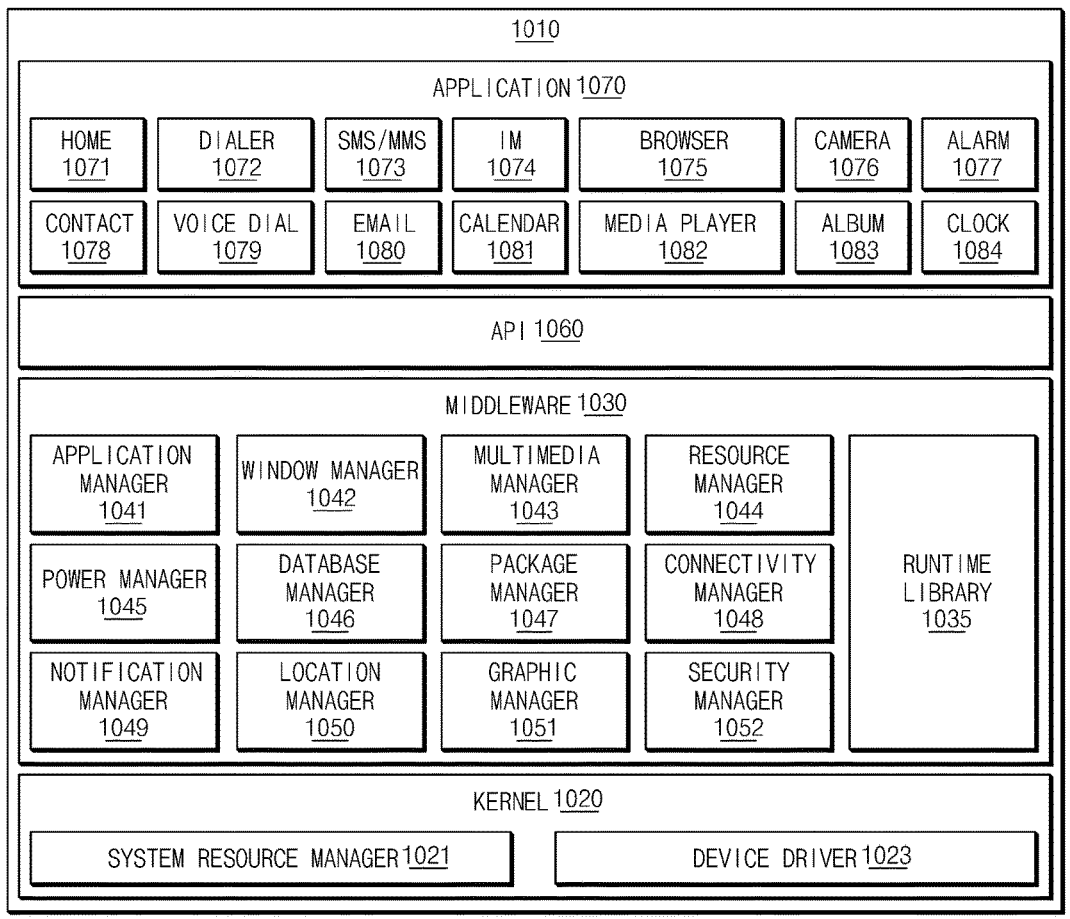
FIG. 10 is a block diagram of an example of a program module, according to various embodiments of the present disclosure.

FIG. 10 is a block diagram of an example of a program module, according to various embodiments of the present disclosure. According to an embodiment of the present disclosure, the program module 1010 (e.g., a program 840 of FIG. 8) may include an operating system (OS) for controlling resources associated with an electronic device (e.g., an electronic device 801 of FIG. 8) and/or various applications (e.g., an application program 847 of FIG. 8) which are executed on the OS. The OS may be, for example, Android, iOS, Windows, Symbian, Tizen, or Bada, and the like.

The program module 1010 may include a kernel 1020, a middleware 1030, an application programming interface (API) 1060, and/or an application 1070. At least part of the program module 1010 may be preloaded on the electronic device, or may be downloaded from an external electronic device (e.g., first and second external electronic devices 802 and 804, a server 806, and the like of FIG. 8).

The kernel 1020 (e.g., a kernel 841 of FIG. 8) may include, for example, a system resource manager 1021 and/or a device driver 1023. The system resource manager 1021 may control, assign, or collect, and the like system resources. According to an embodiment of the present disclosure, the system resource manager 1021 may include a process management unit, a memory management unit, or a file system management unit, and the like. The device driver 1023 may include, for example, a display driver, a camera driver, a Bluetooth (BT) driver, a shared memory driver, a universal serial bus (USB) driver, a keypad driver, a wireless-fidelity (Wi-Fi) driver, an audio driver, or an inter-process communication (IPC) driver.

The middleware 1030 (e.g., a middleware 843 of FIG. 8) may provide, for example, functions the application 1070 needs in common, and may provide various functions to the application 1070 through the API 1060 such that the application 1070 efficiently uses limited system resources in the electronic device. According to an embodiment of the present disclosure, the middleware 1030 (e.g., the middleware 843) may include at least one of a runtime library 1035, an application manager 1041, a window manager 1042, a multimedia manager 1043, a resource manager 1044, a power manager 1045, a database manager 1046, a package manager 1047, a connectivity manager 1048, a notification manager 1049, a location manager 1050, a graphic manager 1051, or a security manager 1052.

The runtime library 1035 may include, for example, a library module used by a compiler to add a new function through a programming language while the application 1070 is executed. The runtime library 1035 may perform a function about input and output management, memory management, or an arithmetic function.

The application manager 1041 may manage, for example, a life cycle of at least one of the application 1070. The window manager 1042 may manage graphic user interface (GUI) resources used on a screen of the electronic device. The multimedia manager 1043 may ascertain a format necessary for reproducing various media files and may encode or decode a media file using a codec corresponding to the corresponding format. The resource manager 1044 may manage source codes of at least one of the application 1070, and may manage resources of a memory or a storage space, and the like.

The power manager 1045 may act together with, for example, a basic input/output system (BIOS) and the like, may manage a battery or a power source, and may provide power information necessary for an operation of the electronic device. The database manager 1046 may generate, search, or change a database to be used in at least one of the application 1070. The package manager 1047 may manage installation or update of an application distributed by a type of a package file.

The connectivity manager 1048 may manage, for example, wireless connection such as Wi-Fi connection or BT connection, and the like. The notification manager 1049 may display or notify events, such as an arrival message, an appointment, and proximity notification, by a method which is not disturbed to the user. The location manager 1050 may manage location information of the electronic device. The graphic manager 1051 may manage a graphic effect to be provided to the user or a user interface (UI) related to the graphic effect. The security manager 1052 may provide all security functions necessary for system security or user authentication, and the like. According to an embodiment of the present disclosure, when the electronic device (e.g., an electronic device 801 of FIG. 8) has a phone function, the middleware 1030 may further include a telephony manager (not shown) for managing a voice or video communication function of the electronic device.

The middleware 1030 may include a middleware module which configures combinations of various functions of the above-described components. The middleware 1030 may provide a module which specializes according to kinds of OSs to provide a differentiated function. Also, the middleware 1030 may dynamically delete some of old components or may add new components.

The API 1060 (e.g., an API 845 of FIG. 8) may be, for example, a set of API programming functions, and may be provided with different components according to OSs. For example, in case of Android or iOS, one API set may be provided according to platforms. In case of Tizen, two or more API sets may be provided according to platforms.

The application 1070 (e.g., an application program 847 of FIG. 8) may include one or more of, for example, a home application 1071, a dialer application 1072, a short message service/multimedia message service (SMS/MMS) application 1073, an instant message (IM) application 1074, a browser application 1075, a camera application 1076, an alarm application 1077, a contact application 1078, a voice dial application 1079, an e-mail application 1080, a calendar application 1081, a media player application 1082, an album application 1083, a clock application 1084, a health care application (e.g., an application for measuring quantity of exercise or blood sugar, and the like), or an environment information application (e.g., an application for providing atmospheric pressure information, humidity information, or temperature information, and the like), and the like.

According to an embodiment of the present disclosure, the application 1070 may include an application (hereinafter, for better understanding and ease of description, referred to as "information exchange application") for exchanging information between the electronic device (e.g., the electronic device 801) and an external electronic device (e.g., the first and second external electronic devices 802 and 804). The information exchange application may include, for example, a notification relay application for transmitting specific information to the external electronic device or a device management application for managing the external electronic device.

For example, the notification relay application may include a function of transmitting notification information, which is generated by other applications (e.g., the SMS/MMS application, the e-mail application, the health care application, or the environment information application, and the like) of the electronic device, to the external electronic device (e.g., the first and second external electronic devices 802 and 804). Also, the notification relay application may receive, for example, notification information from the external electronic device, and may provide the received notification information to the user of the electronic device.

The device management application may manage (e.g., install, delete, or update), for example, at least one (e.g., a function of turning on/off the external electronic device itself (or partial components) or a function of adjusting brightness (or resolution) of a display) of functions of the external electronic device (e.g., the first and second external electronic devices 802 and 804) which communicates with the electronic device, an application which operates in the external electronic device, or a service (e.g., a call service or a message service) provided by the external electronic device.

According to an embodiment of the present disclosure, the application 1070 may include an application (e.g., the health card application of a mobile medical device) which is preset according to attributes of the external electronic device (e.g., the first and second external electronic devices 802 and 804). According to an embodiment of the present disclosure, the application 1070 may include an application received from the external electronic device (e.g., the server 106 or the first and second external electronic devices 802 and 804). According to an embodiment of the present disclosure, the application 1070 may include a preloaded application or a third party application which may be downloaded from a server. Names of the components of the program module 1010 according to various embodiments of the present disclosure may differ according to kinds of OSs.

According to various embodiments of the present disclosure, at least part of the program module 1010 may be implemented in software, firmware, hardware, or at least two or more combinations thereof. At least part of the program module 1010 may be implemented (e.g., executed) by, for example, a processor (e.g., a processor 820 of FIG. 8). At least part of the program module 1010 may include, for example, a module, a program, a routine, sets of instructions, or a process, and the like for performing one or more functions.

The terminology "module" used herein may mean, for example, a unit including one of hardware, software, and firmware or two or more combinations thereof. The terminology "module" may be interchangeably used with, for example, terminologies "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

According to various embodiments of the present disclosure, at least part of a device (e.g., modules or the functions) or a method (e.g., operations) may be implemented with, for example, instructions stored in computer-readable storage media which have a program module. When the instructions are executed by a processor (e.g., a processor 820 of FIG. 8), one or more processors may perform functions corresponding to the instructions. The computer-readable storage media may be, for example, a memory 830 of FIG. 8.

The computer-readable storage media may include a hard disc, a floppy disk, magnetic media (e.g., a magnetic tape), optical media (e.g., a compact disc read-only memory (CD- ROM) and a digital versatile disc (DVD)), magneto-optical media (e.g., a floptical disk), a hardware device (e.g., a ROM, a random access memory (RAM), or a flash memory, and the like). Also, the program instructions may include not only mechanical codes compiled by a compiler but also high-level language codes which may be executed by a computer using an interpreter and the like. The above-mentioned hardware device may be configured to operate as one or more software modules to perform operations according to various embodiments of the present disclosure, and vice versa.

According to various embodiments of the present disclosure, the computer-readable storage media may store a program for executing a method of obtaining data which is requested to perform authentication when being accessed and storing at least some of the data in an embedded secure element (eSE) connected to a processor through a physical channel.

According to various embodiments of the present disclosure, the electronic device may search for a peripheral according to an IP address, not a frame of the layer 2 (L2) in the open system interconnection (OSI) 7 layer, may search for a device without correcting a Wi-Fi driver, and may support Miracast technologies.

According to various embodiments of the present disclosure, the electronic device may improve more power efficiency than that of an L2 broadcasting manner by sending the discovery request message in the form of multicast according to the IP address.

FIGS. 1-10 are provided as an example only. At least some of the operations discussed with respect to these figures can be performed concurrently, performed in different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

Moreover, the embodiments disclosed in this specification are suggested for the description and understanding of technical content but do not limit the range of the present disclosure. Accordingly, the range of the present disclosure should be interpreted as including all modifications or various other embodiments based on the technical idea of the present disclosure.

What is claimed is:

1. A method comprising:
    directly transmitting, by a first electronic device to a second electronic device, a discovery request message, wherein the discovery request message is transmitted in absence of being encapsulated in layer 2 of an Open System Interconnection (OSI) model, and while the first electronic device and the second electronic device are communicatively connected to a same access point (AP);
    receiving, by the first electronic device, a response to the discovery request message that is directly transmitted by the second electronic device according to an IP address of the second electronic device; and
    establishing a Tunneled Direct Link Setup (TDLS) channel with the second electronic device when the response to the discovery request message is received from the second electronic device,
    wherein the discovery request message includes an IP address of the first electronic device, and
    wherein the response includes the IP address of the first electronic device and an IP address of the second electronic device.

2. The method of claim 1, wherein the TDLS channel is established by using at least one of Real Time Streaming Protocol (RTSP) and Real Time Protocol (RTP).

3. The method of claim 1, wherein the discovery request message is transmitted by using broadcast or multicast transmission.

4. The method of claim 1, wherein the response is transmitted by using unicast transmission.

5. The method of claim 1, wherein the discovery request message or the response comprises at least one of an IP address, AP connection information, and a device identifier.

6. The method of claim 1, further comprising:
    establishing, by the first electronic device, a control channel with an access point (AP).

7. The method of claim 1, further comprising:
    determining, by the first electronic device, whether the first electronic device and the second electronic device were previously connected using a previous TDLS channel; and
    automatically establishing the TDLS channel with the second electronic device based on the determination.

8. The method of claim 1, wherein:
    the discovery request message comprises a partial portion of the IP address of the first electronic device, wherein the partial portion of the IP address of the first electronic device is an incomplete fragment of the IP address of the first electronic device; or
    the response comprises a partial portion of the IP address of the second electronic device, wherein the partial portion of the IP address of the second electronic device is an incomplete fragment of the IP address of the second electronic device.

9. The method of claim 1, wherein the discovery request message or the response is transmitted by using Bonjour protocol or Universal Plug-and-Play protocol (UPnP).

10. A system comprising:
a first electronic device; and
a second electronic device,
wherein first electronic device is configured to:
   directly transmit a discovery request message to the second electronic device, wherein the discovery request message is transmitted in absence of being encapsulated in layer 2 of an Open Systems Interconnection (OSI) model, and while the first electronic device and the second electronic device are communicatively connected to a same access point (AP),
   directly receive a response from the second electronic device according to an IP address of the second electronic device, and
   establish a Tunneled Direct Link Setup (TDLS) channel with the second electronic device;
wherein second electronic device is configured to receive the discovery request message, transmit the response, and establish the TDLS channel with the first electronic device,
wherein the TDLS channel is established based on the discovery request message and the response,
wherein the discovery request message includes an IP address of the first electronic device, and
wherein the response includes the IP address of the first electronic device and an IP address of the second electronic device.

11. An electronic device comprising:
a memory;
a communication module; and
at least one processor operatively coupled to the memory, configured to:
   directly transmit, via the communication module to an external electronic device, a discovery request message, wherein the discovery request message is transmitted in absence of being encapsulated in layer 2 of an Open System Interconnection (OSI) model, and while the electronic device and the external electronic device are communicatively connected to a same access point (AP);
   receive a response to the discovery request message that is directly transmitted by the external electronic device according to an IP address of the external electronic device; and
   establish a Tunneled Direct Link Setup (TDLS) channel with the external electronic device when the response to the discovery request message is received,
   wherein the discovery request message includes an IP address of the electronic device, and
   wherein the response includes the IP address of the electronic device and an IP address of the external electronic device.

12. The electronic device of claim 11, wherein the communications module includes a Wi-Fi communication module.

13. The electronic device of claim 12, wherein the TDLS channel is established based on the response.

14. A non-transitory computer-readable storage medium storing one or more programs comprising instructions which, when executed by an electronic device, cause the electronic device to execute the method according to claim 1.

* * * * *